(12) United States Patent
Okamoto et al.

(10) Patent No.: US 11,481,512 B2
(45) Date of Patent: Oct. 25, 2022

(54) ON-BOARD DEVICE AND NON-TRANSITORY STORAGE MEDIUM

(71) Applicant: TOYOTA JIDOSHA KABUSHIKI KAISHA, Toyota (JP)

(72) Inventors: Kota Okamoto, Tokyo (JP); Mutsumi Abe, Tokyo (JP); Satoshi Kato, Toyota (JP); Masaki Miyagawa, Fuchu (JP); Yusuke Hara, Musashino (JP); Takaaki Haga, Higashikurume (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/185,011

(22) Filed: Feb. 25, 2021

(65) Prior Publication Data
US 2021/0271773 A1 Sep. 2, 2021

(30) Foreign Application Priority Data
Mar. 2, 2020 (JP) .............................. JP2020-035123

(51) Int. Cl.
| G06F 21/62 | (2013.01) |
| H04L 67/12 | (2022.01) |
| H04L 67/10 | (2022.01) |
| G06F 16/28 | (2019.01) |

(Continued)

(52) U.S. Cl.
CPC ........ *G06F 21/6245* (2013.01); *G06F 16/285* (2019.01); *H04L 67/10* (2013.01); *H04L 67/12* (2013.01); *B60K 35/00* (2013.01); *B60K 2370/164* (2019.05); *B60K 2370/166* (2019.05); *B60K 2370/176* (2019.05); *G01S 19/13* (2013.01)

(58) Field of Classification Search
CPC .... G07C 5/0841; G07C 5/008; G06F 21/6245
See application file for complete search history.

(56) References Cited

U.S. PATENT DOCUMENTS

2009/0062979 A1* 3/2009 Sakane ................. B60W 50/04
701/48
2014/0372317 A1* 12/2014 Watanabe .......... G06Q 20/1235
705/59

(Continued)

FOREIGN PATENT DOCUMENTS

| JP | 2003-106852 A | 4/2003 |
| JP | 2013-250999 A | 12/2013 |
| JP | 2019-159773 A | 9/2019 |

*Primary Examiner* — Mahran Y Abu Roumi
(74) *Attorney, Agent, or Firm* — Sughrue Mion, PLLC

(57) ABSTRACT

An on-board device includes a processor. The processor is configured to operate as an acquisition unit configured to acquire data from a sensor mounted on a vehicle, a human-machine-interface (HMI) unit configured to perform a process for exerting a human-machine-interface (HMI) function, and a data management unit configured to make determination on a category of the data delivered from the acquisition unit and deliver, to the HMI unit, data in a first category that does not contain data that is not desired to be delivered to the HMI unit. The HMI unit is configured to perform the process for exerting the HMI function based on the data delivered from the data management unit.

8 Claims, 3 Drawing Sheets

(51) Int. Cl.
*B60K 35/00* (2006.01)
*G01S 19/13* (2010.01)

(56) References Cited

U.S. PATENT DOCUMENTS

| | | | |
|---|---|---|---|
| 2016/0203653 A1* | 7/2016 | Liu | G07C 5/085 |
| | | | 701/31.4 |
| 2017/0113686 A1* | 4/2017 | Horita | B60W 30/0956 |
| 2017/0329328 A1* | 11/2017 | Horita | B60W 40/02 |
| 2018/0137692 A1* | 5/2018 | Ohmert | G07C 5/008 |
| 2019/0286843 A1* | 9/2019 | Fukuhara | G07C 5/0841 |
| 2020/0183769 A1* | 6/2020 | Poghosyan | G06F 11/0751 |

* cited by examiner

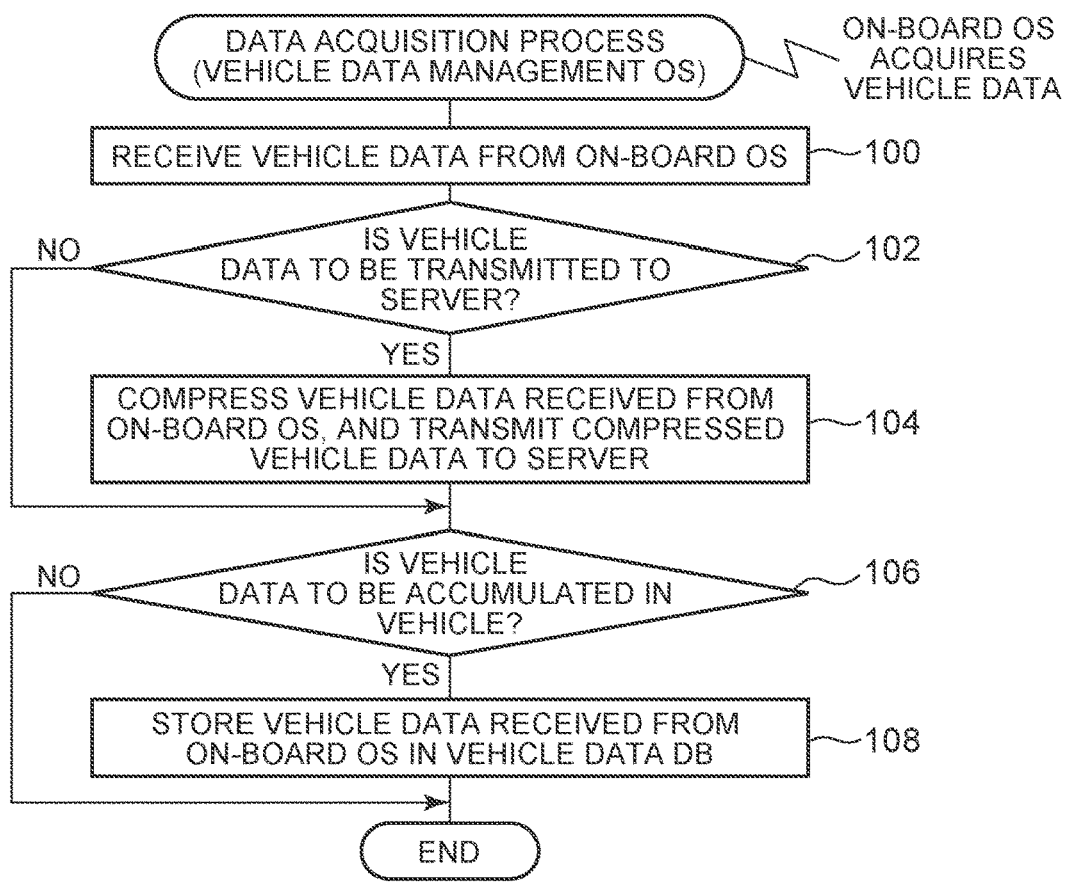
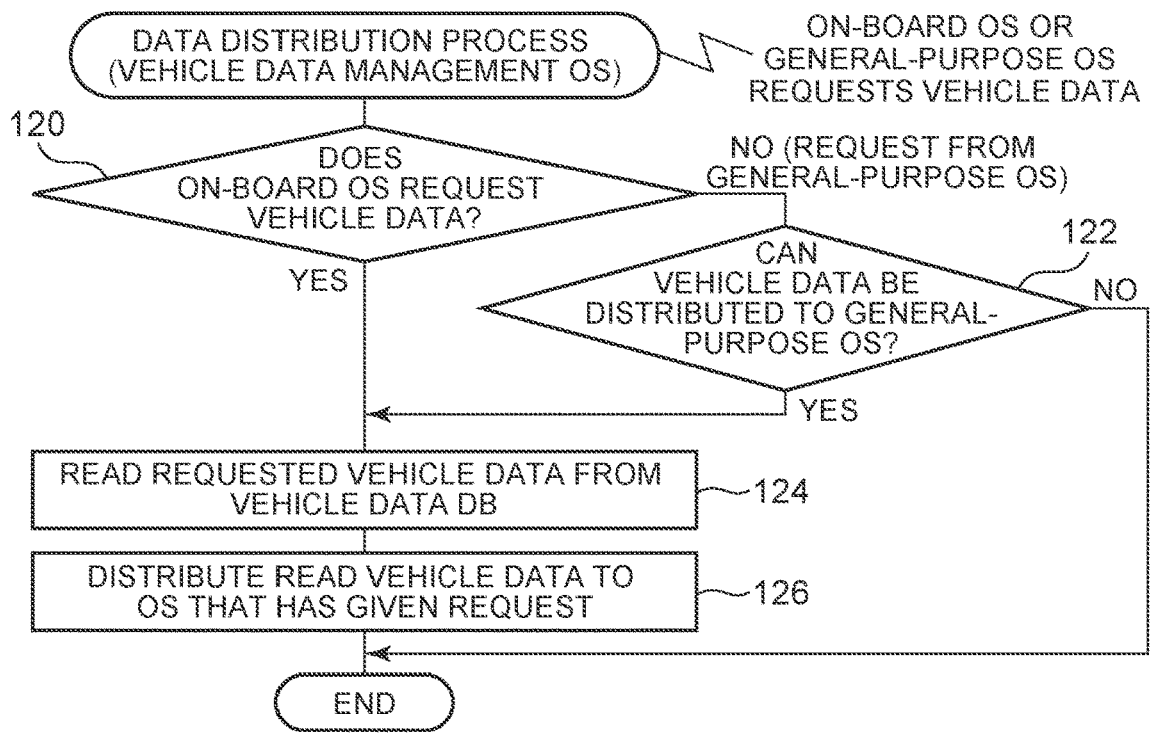

ON-BOARD DEVICE AND NON-TRANSITORY STORAGE MEDIUM

CROSS-REFERENCE TO RELATED APPLICATION

This application claims priority to Japanese Patent Application No. 2020-035123 filed on Mar. 2, 2020, incorporated herein by reference in its entirety.

BACKGROUND

1. Technical Field

The present disclosure relates to an on-board device and a non-transitory storage medium.

2. Description of Related Art

In a technology described in Japanese Unexamined Patent Application Publication No. 2003-106852 (JP 2003-106852 A), when an occupant of a vehicle gives an information search request, vehicle data is transmitted to an information center via a data network, and a search instruction voice uttered by the occupant of the vehicle is transmitted to the information center via a voice network. When a search is made at the information center based on the vehicle data and the search instruction voice uttered by the occupant, search result data information is received from the information center and displayed for the occupant of the vehicle. Further, search result voice information is received from the information center and output for the occupant of the vehicle.

SUMMARY

Vehicles include human-machine-interface (HMI) units configured to perform a process for exerting an HMI function. For example, the HMI unit performs a process for causing a display unit to display a car navigation screen based on global navigation satellite system (GNSS) data. Along with recent advancement of the HMI function, there is a remarkable advancement of the functions of the HMI unit, such as data exchange with an external server. When data is delivered to the HMI unit without exception, security may be impaired depending on the data.

The present disclosure provides an on-board device and a non-transitory storage medium in which data security can be ensured without changing the configuration of an HMI unit configured to perform a process for exerting an HMI function.

An on-board device according to a first aspect of the present disclosure includes: a processor configured to operate as: an acquisition unit configured to acquire data from a sensor mounted on a vehicle; a human-machine-interface (HMI) unit configured to perform a process for exerting a human-machine-interface (HMI) function; and a data management unit configured to make determination on a category of the data delivered from the acquisition unit, and deliver, to the HMI unit, data in a first category that does not contain data that is not desired to be delivered to the HMI unit, wherein the HMI unit is configured to perform the process for exerting the HMI function based on the data delivered from the data management unit.

A non-transitory storage medium according to a second aspect of the present disclosure stores a program that is executable by a processor included in an on-board device having an acquisition unit programmed to acquire data from a sensor mounted on a vehicle, and a human-machine-interface (HMI) unit programmed to perform a process for exerting a human-machine-interface (HMI) function, the program causing the processor to perform functions, as a data management unit, comprising: making determination on a category of the data delivered from the acquisition unit; and delivering, to the HMI unit, data in a first category that does not contain data that is not desired to be delivered to the HMI unit, wherein the HMI unit is programmed to perform the process for exerting the HMI function based on the data delivered from the data management unit.

The present disclosure has an effect that data security can be ensured without changing the configuration of the HMI unit configured to perform the process for exerting the HMI function.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart illustrating an example of a data acquisition process to be executed by a vehicle data management OS; and FIG. 4 is a flowchart illustrating an example of a data distribution process to be executed by the vehicle data management OS.

DETAILED DESCRIPTION OF EMBODIMENTS

Figure 1:
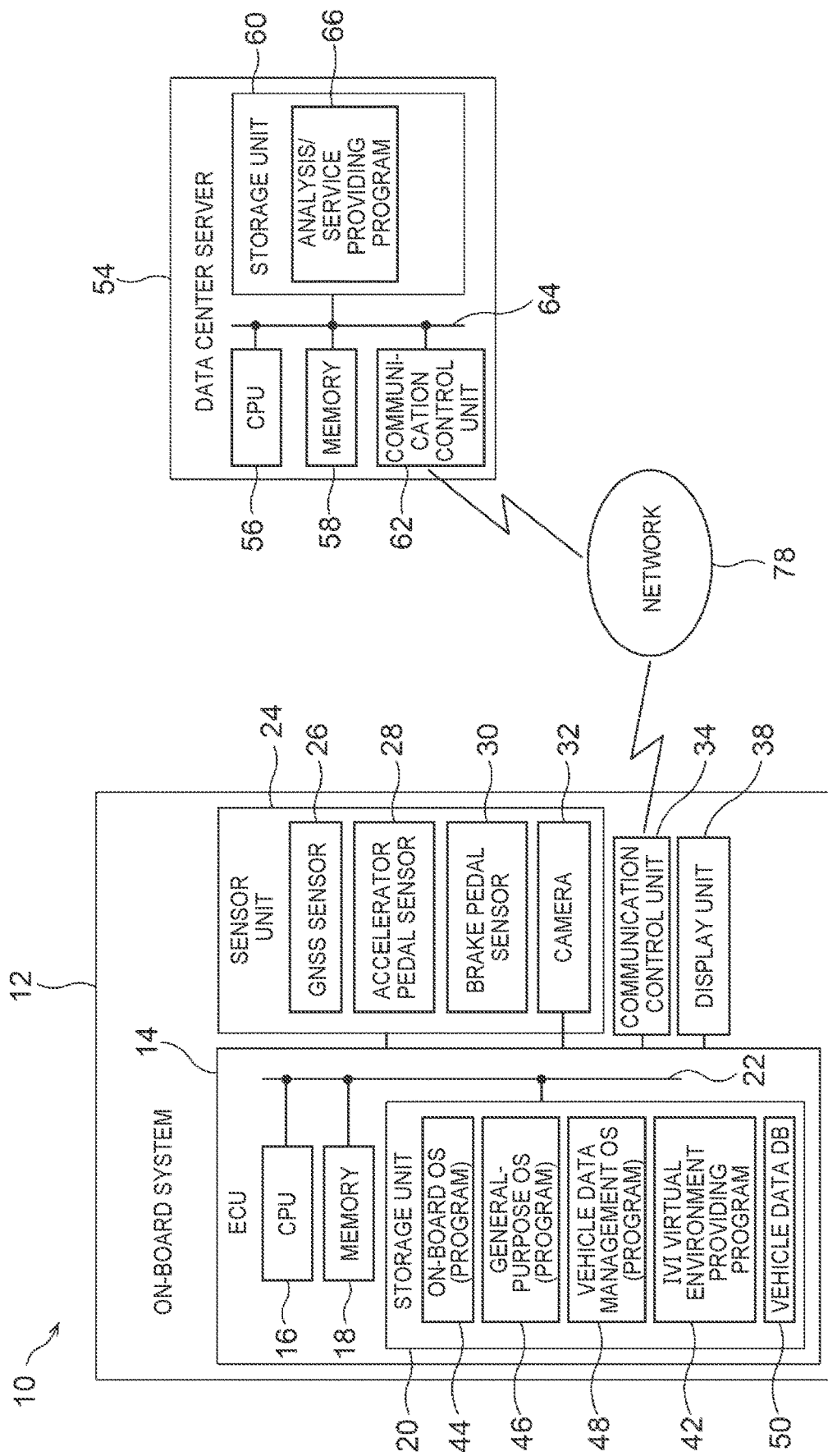
FIG. 1 is a block diagram illustrating the overall configuration of a vehicle data processing system.

An exemplary embodiment of the present disclosure is described below in detail with reference to the drawings. As illustrated in FIG. 1, a vehicle data processing system 10 according to the embodiment includes an on-board system 12 and a data center server 54 (hereinafter referred to simply as "server 54"). The on-board system 12 is mounted on a vehicle 40 (see FIG. 2). The on-board system 12 and the server 54 are communicable with each other via a network 78. The on-board system 12 is an example of an on-board device.

The on-board system 12 includes an electronic control unit (ECU) 14. The ECU 14 includes a central processing unit (CPU) 16, a memory 18 such as a read only memory (ROM) and a random access memory (RAM), and a non-volatile storage unit 20 such as a hard disk drive (HDD) and a solid state drive (SSD). The CPU 16, the memory 18, and the storage unit 20 are communicably connected together via an internal bus 22.

A sensor unit 24, a communication control unit 34, and a display unit 38 are connected to the ECU 14. For example, the communication control unit 34 controls communication between the on-board system 12 and the server 54. The display unit 38 can display arbitrary information.

The sensor unit 24 includes a plurality of types of sensor including a global navigation satellite system (GNSS) sensor 26, an accelerator pedal sensor 28, a brake pedal sensor 30, and a camera 32. The GNSS sensor 26 receives a positional measurement signal from a GNSS satellite to acquire GNSS positional measurement information. The accelerator pedal sensor 28 detects an amount of depression of an accelerator pedal. The brake pedal sensor 30 detects an amount of depression of a brake pedal. The camera 32 shoots the surroundings of the vehicle 40. Examples of other sensors in the sensor unit 24 include a vehicle speed sensor configured to detect a speed of the vehicle, an acceleration sensor configured to detect an acceleration of the vehicle, and a steering angle sensor configured to detect a steering angle of the vehicle. Pieces of data obtained by the sensors in the sensor unit 24 are hereinafter referred to collectively as "vehicle data". The camera 32 is an example of an image shooting unit.

The storage unit 20 of the ECU 14 stores an IVI virtual environment providing program 42, an on-board OS program 44, a general-purpose OS program 46, a vehicle data management OS program 48, and a vehicle data database (DB) 50 configured to store vehicle data.

Figure 2:
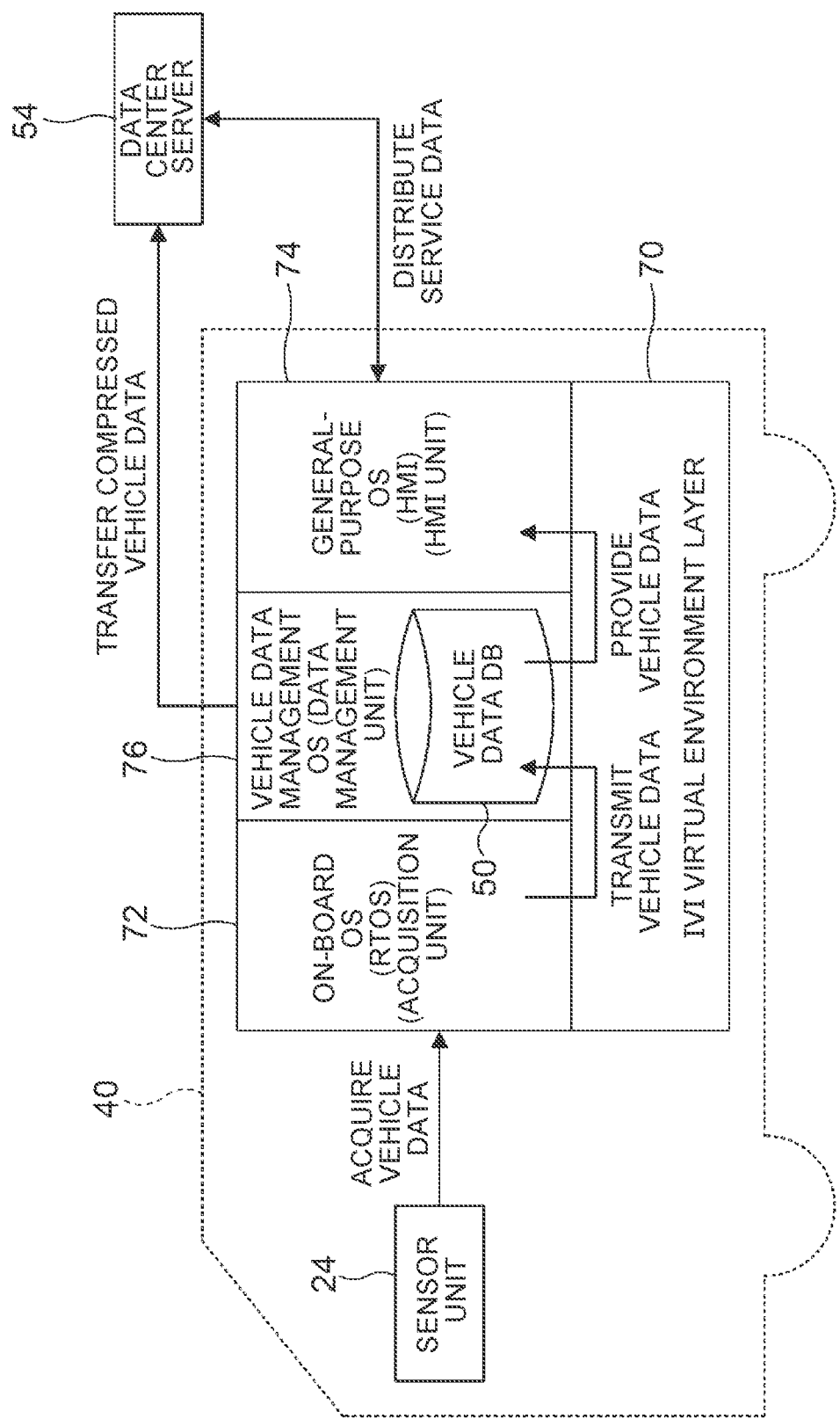
FIG. 2 is a functional block diagram of an on-board system.

The ECU 14 functions as an IVI virtual environment layer 70 illustrated in FIG. 2 such that the IVI virtual environment providing program 42 is read from the storage unit 20, loaded on the memory 18, and executed by the CPU 16. The IVI virtual environment layer 70 is a virtual layer that virtualizes OSes on IVI. The IVI virtual environment layer 70 enables a plurality of OSes to operate in an IVI virtual environment, and supports data exchange between the OSes.

The ECU 14 functions as an on-board OS 72 illustrated in FIG. 2 such that the on-board OS program 44 is read from the storage unit 20, loaded on the memory 18, and executed by the CPU 16. The on-board OS 72 operates in the IVI virtual environment to acquire vehicle data from the sensor unit 24 and transmit the vehicle data to a vehicle data management OS 76 described later. The on-board OS 72 is an example of an acquisition unit, and is an example of a first OS.

The ECU 14 functions as a general-purpose OS 74 illustrated in FIG. 2 such that the general-purpose OS program 46 is read from the storage unit 20, loaded on the memory 18, and executed by the CPU 16. The general-purpose OS 74 operates in the IVI virtual environment to perform a process for implementing an HMI function. The general-purpose OS 74 communicates with the server 54 to acquire service data, and provides a predetermined service for a user through an HMI or the like. The general-purpose OS 74 may communicate with an external server different from the server 54. Examples of the predetermined service include a service for causing the display unit 38 to display a car navigation screen. The general-purpose OS 74 requests and acquires necessary vehicle data from the vehicle data management OS 76 described later. The general-purpose OS 74 is an example of an HMI unit, and is an example of a second OS.

The ECU 14 functions as the vehicle data management OS 76 illustrated in FIG. 2 such that the vehicle data management OS program 48 is read from the storage unit 20, loaded on the memory 18, and executed by the CPU 16, thereby performing a data acquisition process and a data distribution process described later. The vehicle data management OS program 48 is an example of a program according to the present disclosure.

The vehicle data management OS 76 operates in the IVI virtual environment to perform a process for managing vehicle data. That is, the vehicle data management OS 76 makes determination on a category of data received from the on-board OS 72, compresses vehicle data in a second category to be transferred to the server 54, and transfers the compressed vehicle data to the server 54. The vehicle data management OS 76 stores, in the vehicle data DB 50, vehicle data in a category to be accumulated in the vehicle. The vehicle data management OS 76 distributes vehicle data to the on-board OS 72 and the general-purpose OS 74.

Regarding the distribution of vehicle data to the general-purpose OS 74, the vehicle data management OS 76 determines whether the vehicle data is vehicle data in a first category that can be distributed to the general-purpose OS 74 in view of security, and avoids distributing the vehicle data when the vehicle data is vehicle data that cannot be distributed (vehicle data in a category other than the first category). The vehicle data management OS 76 is an example of a data management unit, and is an example of a third OS.

The server 54 includes a CPU 56, a memory 58, a non-volatile storage unit 60, and a communication control unit 62 configured to control communication between, for example, the server 54 and the on-board system 12. The CPU 56, the memory 58, the storage unit 60, and the communication control unit 62 are communicably connected together via an internal bus 64. The storage unit 60 stores an analysis/service providing program 66. The server 54 executes the analysis/service providing program 66 to receive vehicle data transferred from the vehicle data management OS 76, perform processes of, for example, analyzing big data and using the big data for services, and distribute service data toward the general-purpose OS 74. The processes of analyzing big data, using the big data for services, and the like are also simply referred as "service" hereinafter.

Next, the data acquisition process is described as an action of the embodiment with reference to FIG. 3. The data acquisition process is executed by the vehicle data management OS 76 in response to acquisition of vehicle data from the sensor unit 24 by the on-board OS 72.

In Step 100, the vehicle data management OS 76 receives, from the on-board OS 72, the vehicle data acquired by the on-board OS 72 from the sensor unit 24. In Step 102, the vehicle data management OS 76 determines whether the vehicle data received from the on-board OS 72 is data to be transmitted to the server 54 by determining whether the vehicle data received from the on-board OS 72 is vehicle data in the second category. The vehicle data in the second category is vehicle data that can be used for the processes in the server 54 for analyzing the data and using the data for services. Examples of the vehicle data in the second category include image data obtained by shooting the surroundings of the vehicle 40 by the camera 32.

When the result of the determination in Step 102 is positive, the vehicle data management OS 76 proceeds to Step 104. In Step 104, the vehicle data management OS 76 compresses the vehicle data received from the on-board OS 72 (in this case, the vehicle data in the second category), and transmits the compressed vehicle data to the server 54. The vehicle data transmitted to the server 54 in Step 104 is used for the processes in the server 54 for analyzing big data and using the big data for services. When the result of the determination in Step 102 is negative, the vehicle data management OS 76 skips Step 104 and proceeds to Step 106.

In Step 106, the vehicle data management OS 76 determines whether the vehicle data received from the on-board OS 72 is vehicle data to be accumulated in the vehicle 40. The data to be accumulated in the vehicle 40 includes vehicle data in the first category that can be distributed to the general-purpose OS 74, and other vehicle data to be distributed to the on-board OS 72.

When the result of the determination in Step 106 is positive, the vehicle data management OS 76 proceeds to Step 108. In Step 108, the vehicle data management OS 76 stores, in the vehicle data DB 50, the vehicle data received from the on-board OS 72, and terminates the data acquisition process. When the result of the determination in Step 106 is negative, the vehicle data management OS 76 skips Step 108 and terminates the data acquisition process.

Next, the data distribution process is described with reference to FIG. 4. The data distribution process is executed by the vehicle data management OS 76 in response to a request for vehicle data from the on-board OS 72 or the general-purpose OS 74.

In Step 120, the vehicle data management OS 76 determines whether the on-board OS 72 requests the vehicle data. When the on-board OS 72 requests the vehicle data, a positive result is obtained through the determination in Step 120, and the vehicle data management OS 76 proceeds to Step 124. When the general-purpose OS 74 requests the vehicle data, a negative result is obtained through the determination in Step 120, and the vehicle data management OS 76 proceeds to Step 122.

In Step 122, the vehicle data management OS 76 determines whether the vehicle data requested by the general-purpose OS 74 is vehicle data in the first category that can be distributed to the general-purpose OS 74. For example, the vehicle data in the first category does not contain privacy information. Specifically, the vehicle data in the first category is GNSS positional measurement information acquired by the GNSS sensor 26. When the vehicle data requested by the general-purpose OS 74 is the vehicle data in the first category, a positive result is obtained through the determination in Step 122, and the vehicle data management OS 76 proceeds to Step 124.

In Step 124, the vehicle data management OS 76 reads, from the vehicle data DB 50, the vehicle data requested by the on-board OS 72 or the general-purpose OS 74. In Step 126, the vehicle data management OS 76 distributes the vehicle data read in Step 124 to the OS that has given the request (on-board OS 72 or general-purpose OS 74), and terminates the data distribution process.

When the vehicle data requested by the general-purpose OS 74 is not the vehicle data in the first category, a negative result is obtained through the determination in Step 122. The vehicle data management OS 76 skips Steps 124 and 126 and terminates the data distribution process. In this case, vehicle data in a category other than the first category, such as image data containing privacy information and obtained by shooting the surroundings of the vehicle 40 by the camera 32, is prevented from being delivered to the general-purpose OS 74.

As described above, the on-board system 12 according to this embodiment includes the on-board OS 72 configured to acquire vehicle data from the sensor unit 24, the general-purpose OS 74 configured to perform the process for exerting the HMI function based on delivered vehicle data, and the vehicle data management OS 76 configured to make determination on a category of vehicle data delivered from the on-board OS 72 and deliver data in the first category to the general-purpose OS 74. Thus, the security of vehicle data in a category other than the first category can be ensured without changing the configuration of the general-purpose OS 74.

In this embodiment, the vehicle data management OS 76 transmits data in the second category to the server 54, stores, in the vehicle data DB 50, data containing the data in the first category, and delivers, to the general-purpose OS 74, the data in the first category out of the data stored in the vehicle data DB 50. Thus, the data can selectively be transmitted to the server 54 as well, and the data in the first category can be delivered to the general-purpose OS 74 at a timing appropriate to the general-purpose OS 74 (for example, a timing when the general-purpose OS 74 requests the data).

In this embodiment, the vehicle data management OS 76 compresses the data in the second category, and transmits the compressed data in the second category to the server 54. Thus, it is possible to reduce the amount of the data in the second category to be transmitted to the server 54, thereby reducing a traffic from the on-board system 12 to the server 54.

In this embodiment, the on-board OS 72, the general-purpose OS 74, and the vehicle data management OS 76 operate in the IVI virtual environment. Thus, costs can be reduced as compared to a case where the on-board OS 72, the general-purpose OS 74, and the vehicle data management OS 76 operate in environments prepared separately.

In this embodiment, the vehicle data management OS 76 avoids delivering data containing privacy information to the general-purpose OS 74. Thus, it is possible to ensure the security of the data containing privacy information.

In this embodiment, the vehicle data management OS 76 avoids delivering, to the general-purpose OS 74, image data obtained by shooting the surroundings of the vehicle by the camera 32. Thus, the security of the image data can be ensured.

The above description is directed to the mode in which the on-board OS 72, the general-purpose OS 74, and the vehicle data management OS 76 operate in the IVI virtual environment layer 70. The operation environment of each OS is not limited to the IVI virtual environment.

The above description is directed to the mode in which the vehicle data management OS 76 (third OS) functions as the data management unit. In place of the OS, an application may function as the data management unit.

The above description is directed to the mode in which the vehicle data management OS program 48 that is an example of the program according to the present disclosure is pre-stored (preinstalled) in the storage unit 20. The program according to the present disclosure may be provided by being recorded in a non-transitory recording medium such as an HDD, an SSD, or a digital versatile disc (DVD).

An on-board device according to a first aspect of the present disclosure includes: a processor configured to operate as: an acquisition unit configured to acquire data from a sensor mounted on a vehicle; a human-machine-interface (HMI) unit configured to perform a process for exerting a human-machine-interface (HMI) function; and a data management unit configured to make determination on a category of the data delivered from the acquisition unit, and deliver, to the HMI unit, data in a first category that does not contain data that is not desired to be delivered to the HMI unit, wherein the HMI unit is configured to perform the process for exerting the HMI function based on the data delivered from the data management unit.

The aspect described above provides the data management unit configured to make determination on the category of the data delivered from the acquisition unit and deliver the data in the first category to the HMI unit. Therefore, a category of data that is not desired to be delivered to the HMI unit is excluded from the first category. Thus, the delivery of this data to the HMI unit can be suppressed. With the aspect described above, data security can be ensured without changing the configuration of the HMI unit configured to perform the process for exerting the HMI function.

In the aspect described above, the data management unit may be configured to transmit, to a server, data in a second category that is usable for a service, store, in a storage unit, data containing the data in the first category, and deliver, to the HMI unit, the data in the first category out of the data stored in the storage unit.

With the configuration described above, the data can selectively be transmitted to the server as well, and the data in the first category can be delivered to the HMI unit at a timing appropriate to the HMI unit (for example, a timing when the HMI unit requests the data).

In the aspect described above, the data management unit may be configured to compress the data in the second category and transmit the data in the second category which is compressed to the server.

With the configuration described above, it is possible to reduce the amount of the data in the second category to be transmitted to the server, thereby reducing a traffic from the on-board device to the server.

In the aspect described above, the acquisition unit may be implemented by a first operating system (OS) configured to operate in an in-vehicle infotainment (IVI) virtual environment, the HMI unit may be implemented by a second OS configured to operate in the IVI virtual environment, and the data management unit may be implemented by a third OS configured to operate in the IVI virtual environment.

According to the configuration described above, the acquisition unit, the HMI unit, and the data management unit operate in the IVI virtual environment. Thus, costs can be reduced as compared to a case where the acquisition unit, the HMI unit, and the data management unit operate in environments prepared separately.

In the aspect described above, the data management unit may be configured not to deliver, to the HMI unit, data containing privacy information as data in a category different from the first category. The data management unit may be forbidden to deliver, to the HMI unit, data containing privacy information as data in a category different from the first category.

With the configuration described above, the security of the data containing privacy information can be ensured by avoiding delivering the data containing privacy information to the HMI unit.

In the aspect described above, the data management unit may be configured not to deliver, to the HMI unit, image data obtained by shooting surroundings of the vehicle by an image shooting unit as data in a category different from the first category. The data management unit may be forbidden to deliver, to the HMI unit, image data obtained by shooting surroundings of the vehicle by an image shooting unit as data in a category different from the first category.

It is not desirable to deliver, to the HMI unit, the image data obtained by shooting the surroundings of the vehicle because the image data contains privacy information. With the configuration described above, the security of the image data can be ensured by avoiding delivering the image data to the HMI unit.

In the aspect described above, the HMI unit may be configured to output information based on the data delivered from the data management unit.

A non-transitory storage medium according to a second aspect of the present disclosure stores a program that is executable by a processor included in an on-board device having an acquisition unit programmed to acquire data from a sensor mounted on a vehicle, and a human-machine-interface (HMI) unit programmed to perform a process for exerting a human-machine-interface (HMI) function, the program causing the processor to perform functions, as a data management unit, comprising: making determination on a category of the data delivered from the acquisition unit; and delivering, to the HMI unit, data in a first category that does not contain data that is not desired to be delivered to the HMI unit, wherein the HMI unit is programmed to perform the process for exerting the HMI function based on the data delivered from the data management unit.

According to the aspect described above, similarly to the first aspect, data security can be ensured without changing the configuration of the HMI unit configured to perform the process for exerting the HMI function.

What is claimed is:

1. An on-board device comprising a processor configured to operate as:
   an acquisition unit configured to acquire data from a sensor mounted on a vehicle;
   a human-machine-interface (HMI) unit configured to perform a process for exerting a HMI function; and
   a data management unit configured to:
   make a determination on a category of the acquired data delivered from the acquisition unit as at least one of a first category, a second category, and a third category, the first category being different than the second category, the second category containing privacy information that is not to be delivered to the HMI unit, and the third category being usable for a service;
   store, in a storage unit, data containing first data in the first category;
   deliver, out of the data stored in the storage unit to the HMI unit, the first data in the first category that does not contain other data that is not desired to be delivered to the HMI unit;
   block delivery, to the HMI unit, of second data in the second category; and
   transmit, to a server, third data in the third category that is usable for the service,
   wherein the HMI unit is further configured to perform the process for exerting the HMI function based on the first data delivered from the data management unit,
   wherein the data management unit is further configured to compress the third data in the third category and transmit the third data in the third category which is compressed to the server,
   wherein the acquisition unit is implemented by a first operating system (OS) configured to operate in an in-vehicle infotainment (IVI) virtual environment,
   wherein the HMI unit is implemented by a second OS configured to operate in the IVI virtual environment, and
   wherein the data management unit is implemented by a third OS configured to operate in the IVI virtual environment.

2. The on-board device according to claim 1, wherein the data management unit is configured not to deliver, to the HMI unit, image data obtained by shooting surroundings of the vehicle by an image shooting unit as data in the second category.

3. The on-board device according to claim 1, wherein the data management unit is forbidden to deliver, to the HMI unit, data containing the privacy information as the data in the second category.

4. The on-board device according to claim 1, wherein the data management unit is forbidden to deliver, to the HMI unit, image data obtained by shooting surroundings of the vehicle by an image shooting unit as data in the second category.

5. The on-board device according to claim 1, wherein the HMI unit is configured to output information based on the first data delivered from the data management unit.

6. A non-transitory storage medium storing a program that is executable by a processor included in an on-board device having an acquisition unit programmed to acquire data from a sensor mounted on a vehicle, and a human-machine-interface (HMI) unit programmed to perform a process for exerting a HMI function, the program causing the processor to perform functions, as a data management unit, comprising:

making a determination on a category of the acquired data delivered from the acquisition unit as at least one of a first category, a second category, and a third category, the first category being different than the second category, the second category containing privacy information that is not to be delivered to the HMI unit, and the third category being usable for a service;

storing, in a storage unit, data containing first data in the first category;

delivering, out of the data stored in the storage unit to the HMI unit, the first data in the first category that does not contain other data that is not desired to be delivered to the HMI unit;

blocking delivery, to the HMI unit, of second data in the second category; and transmitting, to a server, third data in the third category that is usable for the service, wherein the HMI unit is further programmed to perform the process for exerting the HMI function based on the first data delivered from the data management unit, wherein the data management unit is further configured to compress the third data in the third category and transmit the third data in the third category which is compressed to the server, wherein the acquisition unit is implemented by a first operating system (OS) configured to operate in an in-vehicle infotainment (IVI) virtual environment, wherein the HMI unit is implemented by a second OS configured to operate in the IVI virtual environment, and wherein the data management unit is implemented by a third OS configured to operate in the IVI virtual environment.

7. An on-board device comprising a processor configured to operate as:

an acquisition unit configured to acquire data from a sensor mounted on a vehicle, and implemented by a first operating system (OS) configured to operate in an in-vehicle infotainment (IVI) virtual environment;

a human-machine-interface (HMI) unit configured to perform a process for exerting a HMI function, and implemented by a second OS configured to operate in the IVI virtual environment; and a data management unit configured to:

make a determination on a category of the acquired data delivered from the acquisition unit as at least one of a first category, a second category, and a third category, the first category being different than the second category, the second category containing privacy information that is not to be delivered to the HMI unit, and the third category being usable for a service;

deliver, to the HMI unit, first data in the first category that does not contain other data that is not desired to be delivered to the HMI unit;

block delivery, to the HMI unit, of second data in the second category; and compress third data in the third category and transmit the third data in the third category which is compressed to a server, wherein the data management unit is implemented by a third OS configured to operate in the IVI virtual environment, and wherein the HMI unit is further configured to perform the process for exerting the HMI function based on the first data delivered from the data management unit.

8. A non-transitory storage medium storing a program that is executable by a processor included in an on-board device having an acquisition unit programmed to acquire data from a sensor mounted on a vehicle, and a human-machine-interface (HMI) unit programmed to perform a process for exerting a HMI function, the program causing the processor to perform functions, as a data management unit, comprising:

making a determination on a category of the acquired data delivered from the acquisition unit as at least one of a first category, a second category, and a third category, the first category being different than the second category, the second category containing privacy information that is not to be delivered to the HMI unit, and the third category being usable for a service;

delivering, to the HMI unit, first data in the first category that does not contain other data that is not desired to be delivered to the HMI unit;

blocking delivery, to the HMI unit, of second data in the second category; and compressing third data in the third category and transmitting the third data in the third category which is compressed to a server, wherein the HMI unit is further programmed to perform the process for exerting the HMI function based on the first data delivered from the data management unit, wherein the acquisition unit is implemented by a first operating system (OS) configured to operate in an in-vehicle infotainment (IVI) virtual environment, wherein the HMI unit is implemented by a second OS configured to operate in the IVI virtual environment, and wherein the data management unit is implemented by a third OS configured to operate in the IVI virtual environment.

* * * * *